No. 681,024. Patented Aug. 20, 1901.
D. HOWELL.
STUMP PULLER.
(Application filed Mar. 1, 1901.)
(No Model.)
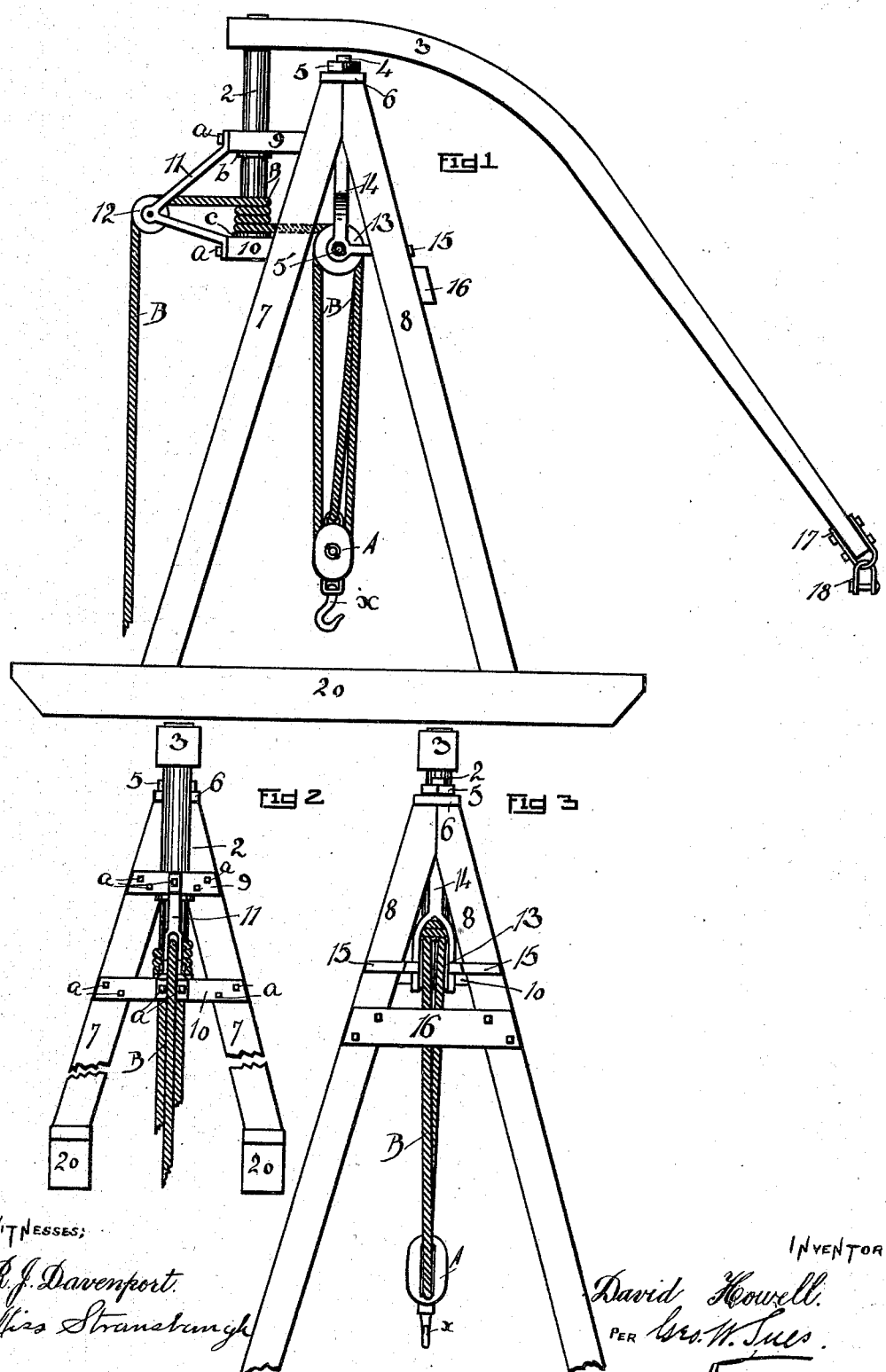
WITNESSES:
R. J. Davenport.
Miss Stransbaugh
INVENTOR
David Howell.
PER Geo. W. Sues.
ATTORNEY
THE NORRIS PETERS CO., PHOTO-LITHO., WASHINGTON, D. C.

UNITED STATES PATENT OFFICE.

DAVID HOWELL, OF OMAHA, NEBRASKA.

STUMP-PULLER.

SPECIFICATION forming part of Letters Patent No. 681,024, dated August 20, 1901.

Application filed March 1, 1901. Serial No. 49,473. (No model.)

*To all whom it may concern:*

Be it known that I, DAVID HOWELL, residing at Omaha, in the county of Douglas and State of Nebraska, have invented certain useful Improvements in Stump-Pullers; and I do hereby declare that the following is a full, clear, and exact description thereof, such as will enable others skilled in the art to which it appertains to make and use the same, reference being had to the accompanying drawings, which form a part of this specification.

This invention has relation to a new and novel improvement in stump-pullers.

The object of my invention is to provide a light portable apparatus adapted to be used as a stump-puller.

In the accompanying drawings I have shown in Figure 1 a side elevation of a stump-puller embodying my invention. Fig. 2 shows an end view with portions broken away, while Fig. 3 shows an enlarged detail disclosing the arrangement of the hanger for the upper pulley.

My invention embodies, essentially, two runners 20 20. From these runners extend upward the supporting-standards 7 7 and 8 8, which are united above to a plate 6, as is shown. The standards 8 8 are further united by means of the transverse brace 16 and the standards 7 7 by means of the transverse braces 9 and 10, as is shown. The transverse brace 10 serves as a bottom for a spool 2, which spool is provided with a lower flange $c$ and the upper flange $b$. This spool 2, it will be noticed, passes through the transverse brace 9 and projects above the upper ends of the standard, so that these braces 9 and 10 act as holders for the spool 2. Secured to the upper end of the spool 2 is a curved sweep 3, to the lower end of which are secured the clevis members 17 and 18, to which suitable draft-animals are secured. Depending from and between the united ends of the standards is a hanger 14, which hanger below is provided with a grooved pulley 13, and from which hanger extend the arms 15 15, secured to the standards 8 8, as is shown in Fig. 3. This hanger, it will be noticed is bifurcated below and is provided with a pin 5', supporting the grooved pulley 13, as shown. Extending outwardly from the transverse braces 9 and 10 is a bracket 11, which is secured by means of the bolts $a$ and revolubly holds the sheave 12, as is shown. Passing over the sheave 12, around the spool 2, and over the grooved pulley 13 and the tackle-block A is a rope B, as is shown. The tackle-block A has a hook $x$ secured to it, as shown.

Now when it is desired to use my device the apparatus is dragged upon the runners 20 by means of the sweep 3 and astride of the stump. To one of the roots of the stump is then secured a rope or chain, which is placed within the hook $x$. The draft-animals are then started to carry the sweep 3 in a circle to revolve the spool 2. Normally the rope B is disengaged from the spool; but as soon as the draft-animals have been properly started an operator grasps the end of the rope B to clamp the same upon the spool 2, so that the harder the rope is clamped upon the spool 2 the more positive is the connection between the spool and rope, and the lower tackle-block A is of course raised as the rope is unwound from the spool 2. If, as it occasionally happens, it is found that the load and strain are greater than the animals can bear, the operator need simply release the end of the rope B, when the load will be detached from the spool.

The great advantage in my stump-puller is that the animals are given a fair start before they are compelled to do any work, and the work then, according to the care of the operator, is thrown upon them at once or gradually. After the stump has been raised the operator, still grasping the rope, drives the animals forward to a point where he wishes the stump deposited, and in simply releasing the rope B the stump is dropped when the chain is unhooked.

It is of course understood that my invention may also be used in carrying loads which are first raised by the action of the sweep-rotated spool and then carried forward without detaching the animals from the apparatus, as the sweep 3 also serves as a tongue. In using this sweep as a tongue the animals are driven around until they are at a point opposite the sheave 12, as there is no swaying around of the runners in this position.

The device is exceedingly simple of construction.

Having thus described my said invention, what I claim as new, and desire to secure by United States Letters Patent, is—

In a stump-puller of the character described, the combination with two runners, of two standards extending upward from each runner, all of said standards being united above at a common point, a brace-bar extending laterally from two of said standards, a spool revolubly secured within said brace-bar, a bracket extending from said brace-bar, a sheave within said bracket, a sweep curving downward from said spool, a hanger secured to said standards, a pulley secured within said hanger, and a rope passing over said hanger-pulley, winding about said spool and finally passing over said bracket-sheave, all arranged substantially as and for the purpose set forth.

Signed in presence of two witnesses.

DAVID HOWELL.

Witnesses:
GEORGE W. SUES,
R. J. DAVENPORT.